United States Patent
Sonoda et al.

(10) Patent No.: US 9,811,449 B2
(45) Date of Patent: Nov. 7, 2017

(54) TEST SCENARIO GENERATION SUPPORT DEVICE AND TEST SCENARIO GENERATION SUPPORT METHOD

(71) Applicant: Hitachi, Ltd., Tokyo (JP)

(72) Inventors: Takahiro Sonoda, Tokyo (JP); Hideyuki Kanuka, Tokyo (JP); Yoichi Nakai, Tokyo (JP); Gaku Saitou, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/228,769

(22) Filed: Aug. 4, 2016

(65) Prior Publication Data
US 2017/0052882 A1    Feb. 23, 2017

(30) Foreign Application Priority Data
Aug. 21, 2015   (JP) .................................. 2015-163587

(51) Int. Cl.
*G06F 9/44*       (2006.01)
*G06F 11/36*      (2006.01)

(52) U.S. Cl.
CPC ................................ *G06F 11/3684* (2013.01)

(58) Field of Classification Search
CPC ............. G06F 11/3684; G06F 11/3688; G06F 11/3664
USPC ......................................................... 717/124
See application file for complete search history.

(56) References Cited

U.S. PATENT DOCUMENTS

| | | | | |
|---|---|---|---|---|
| 2013/0231973 | A1* | 9/2013 | Kanuka | G06Q 10/0633 705/7.27 |
| 2014/0075415 | A1* | 3/2014 | Goldish | G06F 11/3684 717/124 |
| 2014/0365830 | A1* | 12/2014 | Rajan | G06F 11/3684 714/38.1 |

FOREIGN PATENT DOCUMENTS

| | | |
|---|---|---|
| JP | 2013-058075 A | 3/2013 |
| JP | 2013-182410 A | 9/2013 |

* cited by examiner

*Primary Examiner* — Anna Deng
(74) *Attorney, Agent, or Firm* — Foley & Lardner LLP

(57) ABSTRACT

Efficient generation of test scenarios without excess or lack thereof can be supported. A test scenario generation support device includes a storage device which holds use case scenarios relating to an application of a test target and a computation device which identifies from the use case scenarios a vocabulary on a screen display using a predetermined rule, identifies a screen object corresponding to the identified vocabulary for each of the use case scenarios using a predetermined algorithm, and generates a test scenario based on a test pattern defined in advance for each screen object.

4 Claims, 17 Drawing Sheets

USE CASE SCENARIO DESCRIPTION TABLE 110

| USE CASE SCENARIO No. | USE CASE STEP No. | NOUN | VERB | DATIVE OBJECT | ACCUSATIVE OBJECT | CONDITION | TRANSITION DESTINATION USE CASE STEP No. |
|---|---|---|---|---|---|---|---|
| UC001 | US001 | PRE-CONDITION | - | - | - | USER IS LOGGED IN | - |
| UC001 | US002 | USER | OPERATE | - | NAME REGISTRATION SCREEN | | US003 |
| UC001 | US003 | USER | INPUT | NAME FIELD | NAME | | US004 |
| UC001 | US004 | USER | SELECT | GENDER ITEM | MALE, FEMALE | | US005 |
| UC001 | US005 | USER | PRESS | - | REGISTRATION BUTTON | | US006, US007 |
| UC001 | US006 | SELECTION CONDITION | SELECT | - | - | CONTINUATION | US008 |
| UC001 | US007 | SELECTION CONDITION | SELECT | - | - | INTERRUPTION | US009 |
| UC001 | US008 | USER | CONFIRM | - | RESULT | - | - |
| UC001 | US009 | USER | CONFIRM | - | RESULT | - | - |
| UC001 | US010 | POST-CONDITION | - | - | - | INPUT NAME IS REGISTERED | - |

FIG. 3

OBJECT ATTRIBUTE TABLE

| OBJECT No. | OBJECT NAME | CRITERIA TERM | TYPE |
|---|---|---|---|
| OB001 | SCREEN | SCREEN | OPERATION |
| OB002 | TEXT FIELD | FIELD | INPUT |
| OB003 | RADIO BUTTON | ITEM | SELECTION |
| OB004 | BUTTON | BUTTON | INPUT |
| : | : | : | : |

SCREEN DATA TABLE 112

| SCREEN No | SCREEN NAME | EXTRACTION SOURCE USE CASE SCENARIO No |
|---|---|---|
| GA001 | NAME REGISTRATION SCREEN | UC001 |
| : | : | : |
| GA101 | NAME DELETE SCREEN | UC002 |
| : | : | : |

FIG. 6

SCREEN OBJECT DATA TABLE

| SCREEN OBJECT No | OBJECT NAME | OBJECT No | SCREEN No | ATTRIBUTE VALUE | INITIAL VALUE | USE CASE SCENARIO No | USE CASE STEP No |
|---|---|---|---|---|---|---|---|
| GO001 | NAME FIELD | OB002 | GA001 | — | ""(BLANK ROW) | UC001 | US003 |
| GO002 | GENDER ITEM | OB003 | GA001 | MALE, FEMALE | MALE | UC001 | US004 |
| GO003 | REGISTRATION BUTTON | OB004 | GA001 | — | — | UC001 | US005 |
| GO004 | CONTINUATION /INTERRUPTION RADIO BUTTON | OB003 | GA001 | CONTINUATION, INTERRUPTION | CONTINUATION | UC001 | US006, US007 |
| GO005 | NORMAL/ ABNORMAL RADIO BUTTON | OB003 | GA001 | NORMAL, ABNORMAL | NORMAL | UC001 | US008, US009 |
| ... | ... | ... | ... | ... | ... | ... | ... |
| GO101 | NAME FIELD | OB002 | GA101 | — | "" | UC101 | US003 |
| GO102 | DELETE BUTTON | OB004 | GA101 | — | — | UC101 | US004 |
| ... | ... | ... | ... | ... | ... | ... | ... |

FIG. 7

TEST PATTERN TABLE 114

| TEST PATTERN No | OBJECT No | ATTRIBUTE VALUE |
| --- | --- | --- |
| TP001 | OB002 | "" |
| TP002 | OB002 | null |
| TP003 | OB002 | * |
| : | : | : |

FIG. 8

TEST SCENARIO STEP TABLE (TEST PATTERN BASE) 115

| TEST SCENARIO No | TEST SCENARIO STEP No | USE CASE No | SCREEN OBJECT No | CONDITION VALUE |
|---|---|---|---|---|
| TTS001 | TSS01 | UC001 | GO001 | "" |
| TTS001 | TSS02 | UC001 | GO002 | MALE |
| TTS001 | TSS03 | UC001 | GO003 | true |
| TTS001 | TSS04 | UC001 | GO004 | CONTINUATION |
| TTS001 | TSS05 | UC001 | GO005 | NORMAL |
| TTS001 | TSS06 | UC001 | – | – |
| TTS002 | TSS01 | UC001 | GO001 | null |
| TTS002 | TSS02 | UC001 | GO002 | MALE |
| TTS002 | TSS03 | UC001 | GO003 | true |
| TTS002 | TSS04 | UC001 | GO004 | CONTINUATION |
| TTS002 | TSS05 | UC001 | GO005 | NORMAL |
| TTS002 | TSS06 | UC001 | – | – |
| ⋮ | ⋮ | ⋮ | ⋮ | ⋮ |
| TTS010 | TSS01 | UC001 | GO001 | "" |
| TTS010 | TSS02 | UC001 | GO002 | FEMALE |
| TTS010 | TSS03 | UC001 | GO003 | true |
| TTS010 | TSS04 | UC001 | GO004 | CONTINUATION |
| TTS010 | TSS05 | UC001 | GO005 | NORMAL |
| TTS010 | TSS06 | UC001 | – | – |

FIG. 9

TEST SCENARIO STEP TABLE (USE CASE BASE) 117

| TEST SCENARIO No | TEST SCENARIO STEP No | USE CASE No | SCREEN OBJECT No | CONDITION VALUE |
|---|---|---|---|---|
| TTS001 | TSS01 | UC001 | GO001 | "" |
| : | : | : | : | : |
| UTS001 | USS01 | UC001 | GO001 | TEST NAME ONE |
| UTS001 | USS02 | UC001 | GO002 | MALE |
| UTS001 | USS03 | UC001 | GO003 | true |
| UTS001 | USS04 | UC001 | GO004 | CONTINUATION |
| UTS001 | USS05 | UC001 | GO005 | NORMAL |
| UTS001 | USS05 | UC001 | - | REGISTERED |
| UTS002 | USS01 | UC001 | GO001 | TEST NAME TWO |
| UTS002 | USS02 | UC001 | GO002 | MALE |
| UTS002 | USS03 | UC001 | GO003 | true |
| UTS002 | USS04 | UC001 | GO004 | CONTINUATION |
| UTS002 | USS05 | UC001 | GO005 | NORMAL |
| UTS002 | USS06 | UC001 | - | REGISTERED |
| : | : | : | : | : |
| UTS010 | USS01 | UC001 | GO001 | TEST NAME 1 |
| UTS010 | USS02 | UC001 | GO002 | FEMALE |
| UTS010 | USS03 | UC001 | GO003 | true |
| UTS010 | USS04 | UC001 | GO004 | INTERRUPTION |
| UTS010 | USS05 | UC001 | GO005 | ABNORMAL |
| UTS010 | USS05 | UC001 | - | NOT REGISTERED |

FIG. 11

TEST SCENARIO TABLE (USE CASE BASE) 118

| USE CASE SCENARIO No | TEST SCENARIO No | TEST CATEGORY | SIMILAR TEST SCENARIO No |
|---|---|---|---|
| UC001 | TTS001 | - | - |
| UC001 | TTS002 | - | - |
| ... | ... | ... | ... |
| UC001 | TTS010 | - | - |
| UC001 | UTS001 | NORMAL SYSTEM | - |
| UC001 | UTS002 | NORMAL SYSTEM | UTS001 |
| ... | ... | ... | ... |
| UC001 | UTS010 | ABNORMAL SYSTEM | - |

FIG. 12

TEST SCENARIO (TABLE FORM) 540

| TEST SCENARIO STEP | TTS001 | TTS002 | TTS010 | UTS001 | UTS002 | UTS010 |
|---|---|---|---|---|---|---|
| <PRECONDITION> | | | | | | |
|   USER IS LOGGED IN | O | O | O | O | O | O |
| | | | | | | |
| SCREEN NAME | | | | | | |
|   NAME REGISTRATION SCREEN | O | O | O | O | O | O |
|   NAME DELETE SCREEN | | | | | | |
| | | | | | | |
| NAME FIELD | | | | | | |
|   "" | O | | | | | |
|   null | | O | | | | |
|   * | | | O | | | |
|   TEST NAME ONE | | | | O | | |
|   TEST NAME TWO | | | | | O | |
|   TEST NAME 1 | | | | | | O |
| | | | | | | |
| GENDER ITEM | | | | | | |
|   MALE | O | O | | O | O | |
|   FEMALE | | | | | O | O |
| | | | | | | |
| REGISTER BUTTON | | | | | | |
|   PRESS | O | O | O | O | O | O |
| | | | | | | |
| RESULT | – | – | – | | | |
|   REGISTERED | | | | O | O | |
|   NOT REGISTERED | | | | | | O |
| | | | | | | |
| <PRECONDITION> | – | – | – | | | |
|   INPUT NAME IS REGISTERED | | | | O | O | O |
| | | | | | | |
| CLASSIFICATION (NORMAL/ABNORMAL) | NORMAL | NORMAL | NORMAL | NORMAL | NORMAL | NORMAL |
| SIMILAR TEST SCENARIO | | | | | UTS001 | |

FIG. 17

TEST SCENARIO GENERATION SUPPORT DEVICE AND TEST SCENARIO GENERATION SUPPORT METHOD

CROSS-REFERENCE TO RELATED APPLICATION

The present application claims priority pursuant to 35 U.S.C. §119 from Japanese patent application no. 2015-163587, filed on Aug. 21, 2015, the entire disclosure of which is hereby incorporated herein by reference.

BACKGROUND

Technical Field

The present invention relates to a test scenario generation support device and a test scenario generation support method, and specifically relates to a technology that enables to support efficient generation of test scenarios without excess or lack thereof.

Related Art

When an application is developed, demands and the like from customers are organized as requirement definitions. And based on the requirement definitions, necessary functions are designed and refined including, for example, creating use case scenarios that indicate operation procedures for a user and then the application is implemented. The application developed as described above, has a testing based on a test scenario performed in order to ensure the quality. As various types of scenario generation technologies accompanied by the application development described above, technologies as described below are conventionally proposed.

Specifically, for example, a technology (see Patent Literature 1: Japanese Patent Application Laid-Open Publication No. 2013-182410) is proposed that executes: processing in which a computer searches between operation use case descriptions for a succession of a given phrase defined in each operation use case description, identifies a relation between the operation use cases, associates the operation use cases and generates an operation use case flow according to the association; processing in which an operation function high in the respective operation use cases included in the operation use case flow is identified using information on operation function hierarchy, the succession of operation use cases spanning across different operation functions in the operation use case flow is identified, association between the operation functions corresponding to the succession is performed to generate an operation flow; and processing in which the operation use case flow or the operation flow generated is displayed on a display device.

Further, there is also proposed a test item generation device for a scenario test (see Patent Literature 2: Japanese Patent Application Laid-Open Publication No. 2013-58075) that includes: execution path extraction means which extracts an execution path based on an inputted use case description indicating the flow of an interaction between a user and a system to store in an execution path storage means; matching means which performs matching between the use case description and a screen transition diagram indicating transitions between screens and determines that the use case description is incomplete when there is a transition that is present in the screen transition diagram but not in the use case description; missing complementary means which generates a new execution path for the transition missing from the use case description found in the screen transition diagram in the matching means to store in the execution path storage means when the matching means determines that the use case description is incomplete; and test item generation means which reads an execution path from the execution path storage means to generate a test item for the execution path.

SUMMARY OF INVENTION

Conventionally, it was often the case that a test scenario was generated by a person in charge of the generation by performing design, definition and a confirmation operation, one by one. Under such conditions, the number of steps required is likely to increase, and the efficiency when developing an application as a whole is likely to deteriorate. For example, since the size of an operation application is large, there is a concern that when a test scenario is generated, a test event is overlooked or duplicated to create excess or lack in the generated test scenario. In such a case, the quality of the application may deteriorate.

Hence, an object of the present invention is to provide a technology that enables to support the efficient generation of test scenarios without excess or lack thereof.

In order to solve the foregoing problem, a test scenario generation support device according to the present invention includes: a storage device configured to hold use case scenarios relating to an application of a test target; and a computation device configured to identify from the use case scenarios a vocabulary relating to a screen display using a predetermined rule, to identify a screen object corresponding to the identified vocabulary for each of the use case scenarios using a predetermined algorithm, and to generate a test scenario based on a test pattern defined in advance for each screen object.

In a test scenario generation support method of an information processing device including a storage device holding use case scenarios on an application of a test target, the method includes the steps of: identifying from the use case scenarios a vocabulary relating to a screen display using a predetermined rule, identifying a screen object corresponding to the identified vocabulary for each of the use case scenarios using a predetermined algorithm, and generating a test scenario based on a test pattern defined in advance for each screen object.

According to the present invention, it is possible to support efficient generation of test scenarios without excess or lack thereof.

BRIEF DESCRIPTION OF DRAWINGS

For a more complete understanding of the present invention and the advantages thereof, reference is now made to the following description taken in conjunction with the accompanying drawings wherein:

FIG. 3 is a diagram showing an example of a configuration of a use case scenario description table of one embodiment of the present invention;

FIG. 6 is a diagram showing an example of a configuration of a screen data table of one embodiment of the present invention;

FIG. 7 is a diagram showing an example of the configuration of a screen object data table of one embodiment of the present invention;

FIG. 8 is a diagram showing an example of a configuration of a test pattern table of one embodiment of the present invention;

FIG. 9 is a diagram showing first configuration example of a test scenario step table (test pattern base) of one embodiment of the present invention;

FIG. 11 is a diagram showing a second configuration example of a test scenario step table (use case base) of one embodiment of the present invention;

FIG. 12 is a diagram showing a second configuration example of a test scenario table (use case base) of one embodiment of the present invention;

FIG. 17 is a diagram showing an example of the test scenario of one embodiment of the present invention.

DESCRIPTION OF EMBODIMENTS

Configuration of Device

Figure 1:
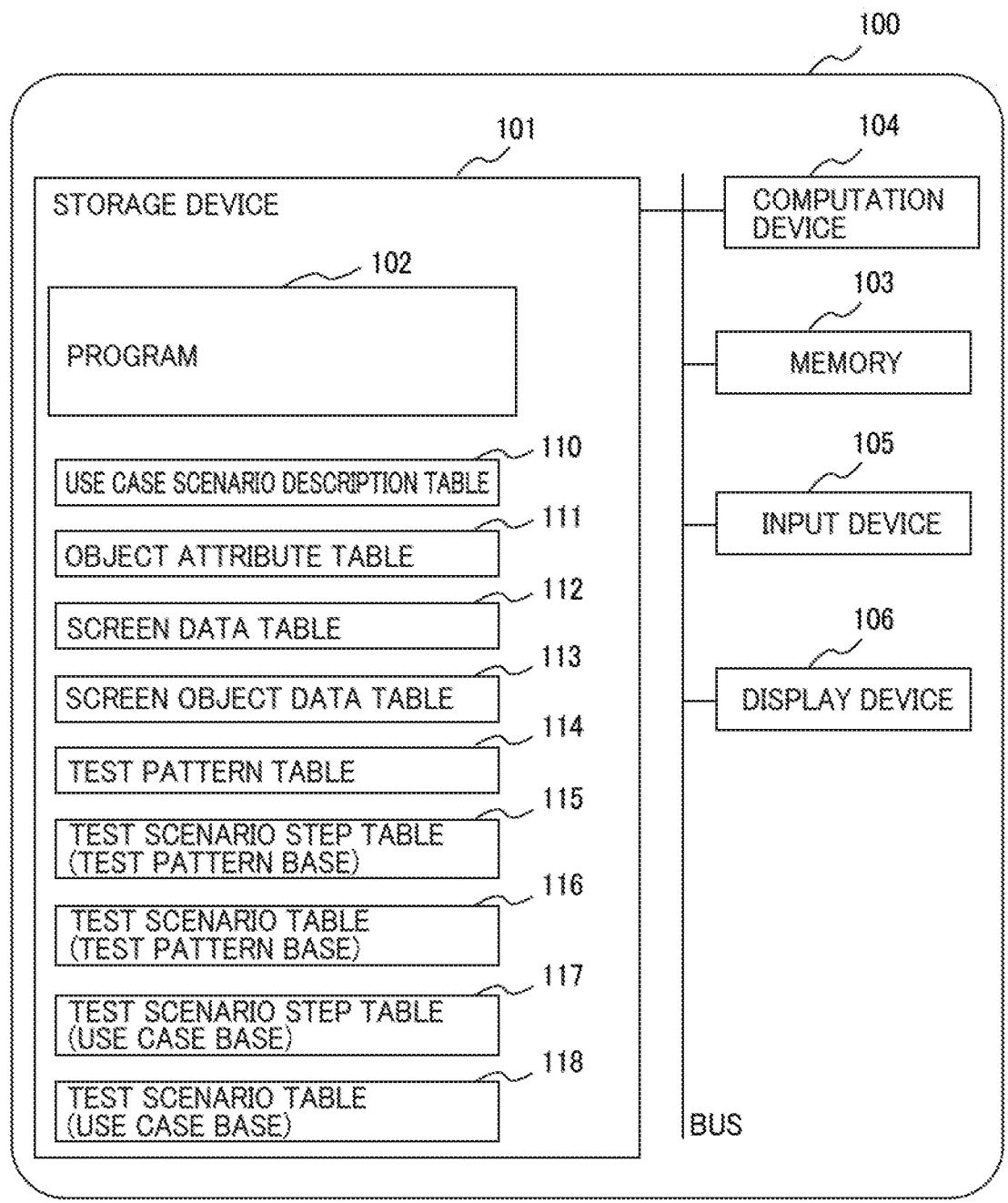
FIG. 1 is a diagram showing an example of a configuration of a test scenario generation support device of one embodiment of the present invention.

Embodiments of the present invention will be described in detail below with reference to the drawings. FIG. 1 is a diagram showing an example of the configuration of a test scenario generation support device 100 in the present embodiment. The test scenario generation support device 100 shown in FIG. 1 is a computer device that enables to support efficient generation of a test scenario without excess or lack thereof.

The hardware configuration of the test scenario generation support device 100 is as follows. Specifically, the test scenario generation support device 100 includes: a storage device 101 which is formed with an appropriate nonvolatile storage element such as an SSD (Solid State Drive) or a hard disk drive; a memory 103 which is formed with a volatile storage element such as a RAM; a computation device 104 such as a CPU which, for example, reads out programs 102 held in the storage device 101 to the memory 103 and executes the programs 102 so as to integrally control the device itself and which performs various types of determinations, computations and control processing; an input device 105 which receives a key input or a voice input from a user; and a display device 106 such as a display which displays processing data.

Figure 2:
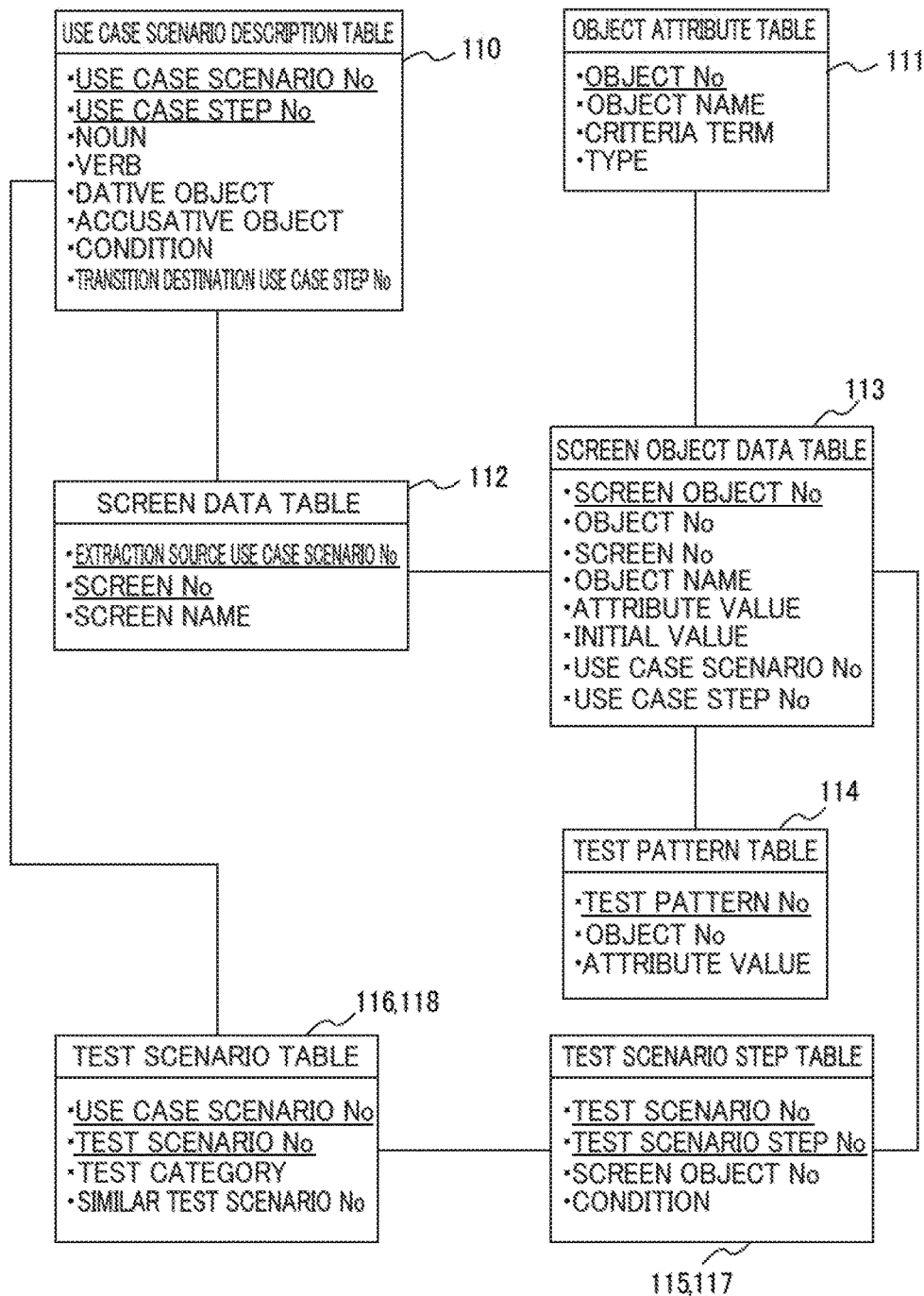
FIG. 2 is diagram illustrating a relationship among tables of one embodiment of the present invention.

At least tables are stored within the storage device 101 in addition to the programs 102 for implementing necessary functions as the test scenario generation support device 100 of the present embodiment. The tables, having the relationship thereof illustrated in FIG. 2, include a use case scenario description table 110, an object attribute table 111, a screen data table 112, a screen object data table 113, a test pattern table 114, a test scenario step table (test pattern base) 115, a test scenario table (test pattern base) 116, a test scenario step table (use case base) 117 and a test scenario table (use case base) 118. The records of the tables are configured such that they are linked between predetermined tables with a predetermined value used as a key.

Among the tables included in the table group described above, the details of the use case scenario description table 110 are shown in FIG. 3. The use case scenario description table 110 in the present embodiment is a table in which there is stored a use case scenario described with regard to the application of a test target by a person in charge of design of the application or the like.

The use case scenario description table 110 is a collection of records with which the values of the following individual items are associated, and such items include: a use case step No. which corresponds to each operation performed by the user in the use case scenario where a use case scenario key is used as a key to uniquely indicate a use case scenario; a "noun" which mainly indicates the actor of the action of the use case step; a "verb" which indicates the content of the action by the actor of the action; an object "dative object" which indicates a direct target of the action; an "accusative object" which indicates a target that is indirectly affected by the action; "condition" which indicates the execution condition of the action; and a "transition destination use case step No." which indicates a use case step that is a transition destination after the execution of the action.

Various circumstances that lead to the creation of the use case scenario description table 110 can be assumed, and for example, a case can be assumed in which the test scenario generation support device 100 outputs to the display device 106 an appropriate interface having entry fields for the individual items described above and acquires input values in the entry fields from the input device 105.

Alternatively, a case can be assumed in which the test scenario generation support device 100 uses an appropriate natural language analysis program such as a morphological analysis program to perform analysis processing on the use case scenario described in a conventional form, and in which in a sentence including a verb, processing is performed where its subject is input to the "noun" field described above and where the verb is input to the "verb" field so as to form each record. In any case, the generation method is not limited.

Figure 4:
FIG. 4 is a diagram showing an example of a configuration of an object attribute table of one embodiment of the present invention.

FIG. 4 is a diagram showing an example of the configuration of the object attribute table 111 in the present embodiment. The object attribute table 111 in the present embodiment is a table in which a rule for identifying a screen object from a use case scenario is defined. The object attribute table 111 is a collection of records in which an object No. uniquely indicating a screen object is used as a key, and with which the values of an object name, a criteria term that needs to be identified in the use case scenario and a type are associated.

Specific examples of the other tables forming the table group discussed previously will be described later along with the description of a flow and the like.

EXAMPLES OF FUNCTIONS

Functions included in the test scenario generation support device 100 of the present embodiment will then be described. As discussed above, the functions described below can be said to be, for example, functions that are implemented by executing the programs 102 included in the test scenario generation support device 100.

The test scenario generation support device 100 in the present embodiment has the function of reading, from the storage device 101, the use case scenario description table 110 which is a use case scenario with regard to the application of the test target, identifying, from the use case scenario description table 110, a vocabulary relating to a screen display with a predetermined rule defined in the object attribute table 111 and identifying a screen object corresponding to the identified vocabulary with a predetermined algorithm for each of the use case scenarios.

The test scenario generation support device 100 also has a function of generating a test scenario (test pattern base) with regard to the individual screen object identified as described above based on a test pattern defined in advance in the test pattern table 114 for storing in the test scenario table 116 and outputting it to the display device 106.

The test scenario generation support device 100 also has the function of setting the screen object identified as described above to predetermined screen data which is held in the storage device 101 in advance in a manner corresponding to the use case scenario so as to generate a screen mock-up and outputting the screen mock-up to the display device 106.

In this case, the test scenario generation support device 100 has the function of acquiring, from the input device 105, contents input by the user to the screen object through the screen mock-up displayed on the display device 106 as described above and storing the input contents in the memory 103 as a test pattern with regard to the individual screen object.

The test scenario generation support device 100 also has the function of generating an additional test scenario (use case base) based on the test pattern obtained through the screen mock-up in the above manner, merging the test scenario (use case base) further generated and the above-described test scenario (test pattern base) which has already been obtained and thereby generating the final test scenario.

The test scenario generation support device 100 also has the function of identifying, in generating the individual test scenarios described above, test scenarios which are similar to each other, based on a predetermined algorithm where, for example, the concepts of input values on a predetermined screen object (for example: the entry field of a predetermined value) are common, between the individual test scenarios which have already been created and held in the memory 103, the test scenario step table (test pattern base) 115 or the test scenario table (use case base) 118, and outputting information with regard to the similar test scenarios to the display device 106.

EXAMPLE OF FLOW

An actual procedure of the test scenario generation support method in the present embodiment will be described below with reference to the drawings. Various types of operations corresponding to the test scenario generation support method which will be described below are realized by programs which are read out to the memory or the like and executed by the test scenario generation support device 100. The programs are formed with codes for performing various types of operations which will be described below.

Figure 5:
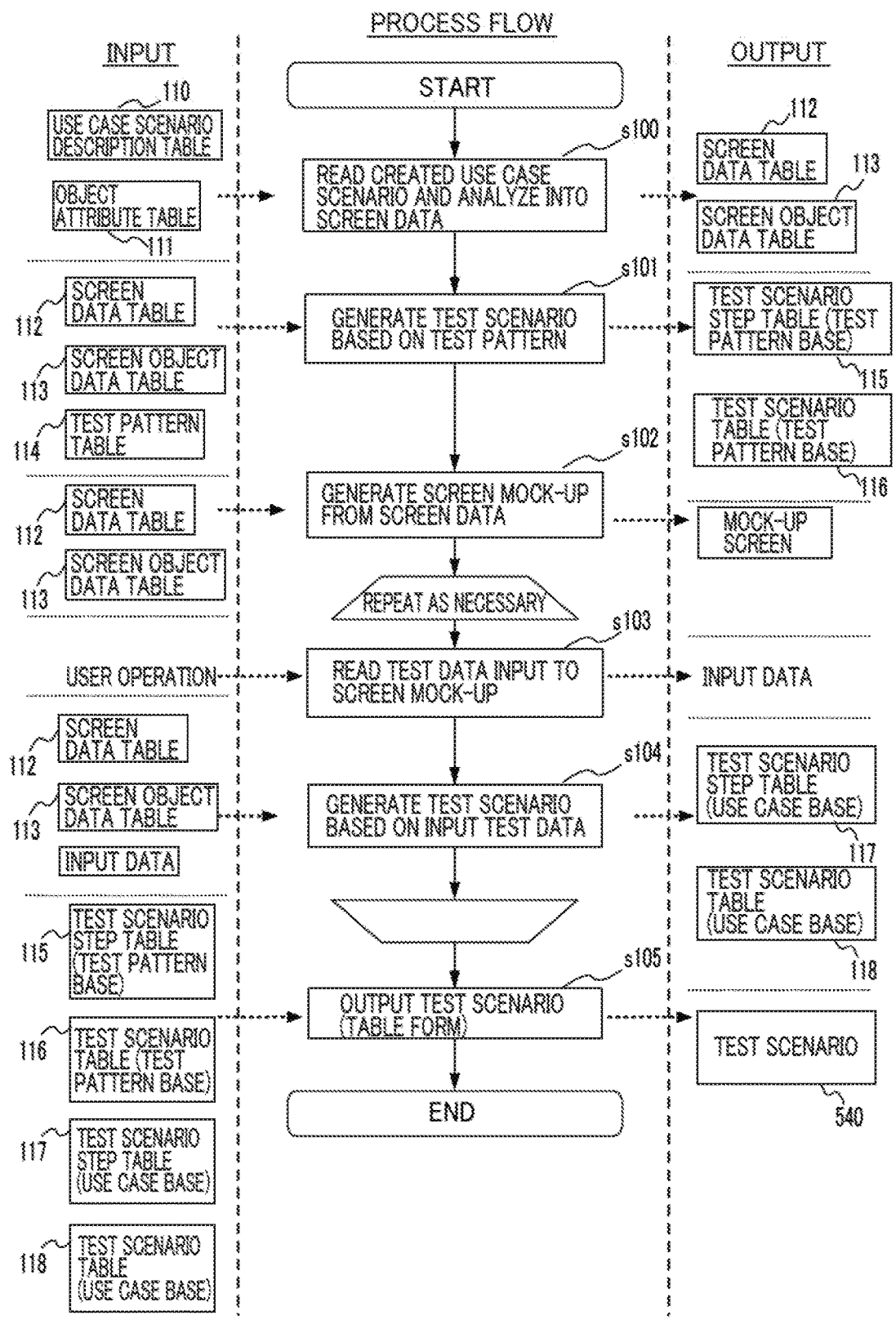
FIG. 5 is a diagram showing an example of a flow of a test scenario generation support method of one embodiment of the present invention.

FIG. 5 is a diagram showing an example of the flow of the test scenario generation support method in the present embodiment. In this case, the test scenario generation support device 100 reads the use case scenario description table 110 and the object attribute table 111 from the storage device 101 to the memory 103, executes analysis processing such as the identification of the screen object from the use case scenario and thereby generates the screen data table 112 and the screen object data table 113 (s100).

The details of the processing in the step s100 will be described below. The screen data table 112 described above is a table in which a list of screens utilized in the use case scenario indicated by the use case scenario description table 110 is managed.

In generating the screen data table 112, the test scenario generation support device 100 uses, as a key, for example, the use case scenario No. specified by the user with the input device 105, searches for a record in the use case scenario description table 110 and reads a value in the "accusative object" field in the record. The test scenario generation support device 100 reads, in the object attribute table 111, a criteria term "screen" in the record in which the value in the "object name" field is "screen".

The test scenario generation support device 100 compares the value of the "accusative object" read from the use case scenario description table 110 with the criteria term "screen" obtained from the object attribute table 111, and identifies, when the "accusative object" ends with the value "screen", the value of the "accusative object" to be the value indicating the screen object.

The test scenario generation support device 100 generates, in the screen data table 112, a screen No. with an appropriate numbering rule to generate a new record. The test scenario generation support device 100 sets the name of the screen object identified as described above, that is, sets the value of the "accusative object" to the "screen name" field in the record.

In the case of the use case scenario description table 110 shown in FIG. 3, with regard to the record in which the use case scenario No. is "UC001" and the use case step No. is "US002", the "accusative object" is the "name registration screen", and ends with the value "screen". Hence, the "name registration screen" can be set to the screen data table 112 as the screen name indicating the screen object.

In identifying and setting the "screen name" as described above, the test scenario generation support device 100 acquires the "use case scenario No." of the record in the use case scenario description table 110 to set to the "extraction source use case scenario No." field of the record in the screen data table 112. In the example described above, "UC001" is set.

The generation of the screen object data table 113 will be described. The screen object data table 113 is a table in which the screen objects of the respective screens utilized in the use case scenario are managed.

In this case, the test scenario generation support device 100 makes a determination as to the values of the "dative object" and the "accusative object" in the use case scenario description table 110 described above, and sets, according to the results thereof, the value to the "object name" of the record generated in the screen object data table 113.

For example, when the respective records in the use case scenario description table 110 are referenced to find that values are set to both the "dative object" field and the "accusative object" field and the value of the "dative object" ends with any one of the values in the "criteria term" column in the object attribute table 111, the test scenario generation support device 100 sets the value of the "dative object" to the "object name" field in the record of the screen object data table 113.

Meanwhile, when the respective records in the use case scenario description table 110 are referenced to find that a value is set only to the "accusative object" and the value ends with any one of the values in the "criteria term" column in the object attribute table 111, the test scenario generation support device 100 sets the value of the "accusative object" to the "object name" field in the record of the screen object data table 113.

Whereas, when the respective records in the use case scenario description table 110 are referenced to find that values are set neither to the "dative object" nor to the "accusative object", and in this case, when the value in the "noun" field is a "selection condition" and the value in the "condition" field is "continuation", the test scenario generation support device 100 sets a "continuation/interruption radio button" to the "object name" field in the record of the screen object data table 113.

Moreover, when the respective records in the use case scenario description table 110 are referenced to find that the value in the "verb" field is "confirm", and the value in the "verb" field in a record thereabove is not "confirm" (condition in which a duplication operation caused by a plurality of steps where the value of the "verb" is "confirm" is prevented), the test scenario generation support device 100 sets a "normal/abnormal radio button" to the "object name" field in the screen object data table 113.

Then, the test scenario generation support device 100 makes a determination as to the values of the "dative object" and the "accusative object" in the use case scenario description table 110, and sets, according to the results thereof, the value to the "object No." of the record generated in the screen object data table 113.

For example, when the test scenario generation support device 100 references the respective records in the use case scenario description table 110 to find that values are set both to the "dative object" field and to the "accusative object" field and the value of the "dative object" ends with any one of the values in the "criteria term" column in the object attribute table 111, the test scenario generation support device 100 sets the value in the "object No." field of the record to the "object No." field in the record of the screen object data table 113.

Moreover, when the test scenario generation support device 100 references the respective records in the use case scenario description table 110 to find that a value is set only to the "accusative object" and the value ends with any one of the values in the "criteria term" column in the object attribute table 111, the test scenario generation support device 100 sets the value in the "object No." field of the record to the "object No." field in the record of the screen object data table 113.

On the other hand, when the test scenario generation support device 100 references the respective records in the use case scenario description table 110 to find that values are set neither to the "dative object" field nor to the "accusative object" field, and in this case, when the value in the "noun" field is the "selection condition" and the value in the "condition" field is the "continuation", the test scenario generation support device 100 sets the value, of the object No. having the "object name" of the record corresponding to the "radio button", to the "object No." field in the record of the screen object data table 113. In the case of the present embodiment, "OB003" is set.

Moreover, when the test scenario generation support device 100 references the respective records in the use case scenario description table 110 to find that the value in the "noun" field is "user" and the value in the "verb" field is "confirm", the test scenario generation support device 100 sets the value, of the object No. having the "object name" of the record corresponding to the "radio button", to the "object No." field in the record of the screen object data table 113.

Subsequently, when the test scenario generation support device 100 extracts the "object name" in the screen object data table 113 from the dative object column or the like in the use case scenario description table 110, the test scenario generation support device 100 identifies the record which has the "accusative object" in the use case scenario description table 110 ending with "screen", and has the use case step No. indicating a stage earlier (e.g., the end value of the use case step No. being smaller) than the record of the extraction source (record including the value in the dative object field described above: record in the use case scenario description table 110) as well as has the closest use case step No., and identifies the record that has, as the "screen name", the value of the "accusative object" of the record, in the screen data table 112. The test scenario generation support device 100 also sets the value of the "screen No." indicated by the identified record to the record in the screen object data table 113.

The test scenario generation support device 100 identifies, among the records in the object attribute table 111, the record in which the value of the "object name" is the "radio button", uses its criteria term "item" as the key to search for the value in the "dative object" field in the use case scenario description table 110.

Here, the record having the value in the "dative object" field in the use case scenario description table 110 being such as the "gender item" which matches the "item" in the "criteria term" field in the object attribute table 111, that is, the record which corresponds to the "radio button" is identified, and the value of the "accusative object" (in this example, the "use case step No." in the use case scenario description table 110 is "male, female" of the record "US004") is set to an attribute value field in the screen object data table 113.

When in the processing described above, values are set neither to the "dative object" nor to the "accusative object" in the use case scenario description table 110, the value in the "noun" field is "selection condition" and the value in the "condition" field is "continuation", the test scenario generation support device 100 sets the value of "continuation, interruption" to the attribute value field in the screen object data table 113.

When in the use case scenario description table 110, the value in the "verb" field is "confirm" and the value in the "verb" field of the record right thereabove is a value other than "confirm", the test scenario generation support device 100 sets the value of "normal, abnormal" to the attribute value field in the screen object data table 113.

When the value of the "object No." of the record in the screen object data table 113 corresponds to a "text field" indicated by the "object name" field in the object attribute table 111 (in this example, "OB002"), the test scenario generation support device 100 sets a "(blank row)" to the initial value field in the screen object data table 113.

Meanwhile, when the value of the "object No." of the record in the screen object data table 113 corresponds to the "radio button" indicated by the "object name" field in the object attribute table 111 (in this example, "OB003"), the test scenario generation support device 100 sets the value at the head among the values in the "attribute value" field in the record of the screen object data table 113 (in this example, "male" in "GO002") to the initial value field in the screen object data table 113.

Whereas, when the value of the "object No." of the record in the screen object data table 113 does not correspond to any of the cases described above, the test scenario generation support device 100 sets "−" (no initial value) to the initial value field in the screen object data table 113.

Then, the test scenario generation support device 100 executes processing for generating a test scenario based on a test pattern (s101). In this case, the test scenario generation support device 100 first executes generation of the test scenario step table 115 (after generating the test pattern base test scenario).

The test scenario generation support device 100 includes in advance the test pattern table 114 (FIG. 8) in the storage device 101. The test pattern table 114 is a table which defines for each object a standard input value used when the test is performed. In the example of FIG. 8, the test pattern table 114 is a collection of records in which the test pattern No. uniquely indicating the test pattern is used as a key, and has associated the values of the object No. indicating the screen object where the attribute of the input value or the like may change depending on the test pattern with the attribute value covering the variations in the value.

In generating the test scenario step table 115, when a value is set to the "attribute value" for each of the records of the screen object data table 113, the test scenario generation support device 100 identifies all the values as candidate values for the "condition value" field in the test scenario step table 115.

The test scenario generation support device 100 uses, as a key, the value of the "object No." in each of the records of the screen object data table 113, searches the test pattern table 114 and identifies the "attribute value" of the record as the candidate value in the same manner as described above.

The test scenario generation support device 100 totally combines all the candidate values obtained in this way, generates all the patterns of the test scenarios and sets them to the test scenario step table 115.

The configuration of the test scenario step table 115 is as illustrated in FIG. 9. In this case, the test scenario step table 115 is a collection of records in which a test scenario No. uniquely indicating a test scenario is used as a key, and with which the values of a test scenario step No. uniquely indicating the step within the test scenario, a use case No. uniquely indicating a use case of the test target, a screen object No. uniquely indicating a screen object used there and the condition value that, for example, is input in the screen object are associated.

In the test scenario step table 115 described above, for example, as to the value in the "use case No." field, the test scenario generation support device 100 searches for the value of the "screen No." in the screen object data table 113 with regard to the "screen No." field in the screen data table 112, and sets the value of the "extraction source use case scenario No." indicated by the record.

As to the value in the "screen object No." field, the test scenario generation support device 100 sets the value in the "screen object No." field in the screen object data table 113. In the case of the record which is added last in each test scenario, "−" is set.

As to the value in the "condition value" field, a setting is made by the following processing. Specifically, when the value in the "attribute value" field in the screen object data table 113 is "−", for each record of the "test scenario No." in the test scenario step table 115, the test scenario generation support device 100 searches for the "screen object No." using the value of the "object No." in the test pattern table 114 to acquire the value of the corresponding "attribute value". The test scenario generation support device 100 sets the condition values such that in the entire test scenarios, the respective condition values input associated with the respective test scenario step Nos. are totally combined.

When the value in the "attribute value" field in the screen object data table 113 is a value other than "−", the test scenario generation support device 100 sets any one of the values (makes a setting such that the respective condition values are totally combined).

Figure 10:
FIG. 10 is a diagram showing a first configuration example of a test scenario table (test pattern base) of one embodiment of the present invention.

Subsequently, the test scenario generation support device 100 generates the test scenario table (test pattern base) 116 (FIG. 10). In this case, the test scenario generation support device 100 generates one record in the test scenario table 116 each time the test scenario is generated in the test scenario step table 115.

Then, the test scenario generation support device 100 sets the value in the "use case No." field, listed at the time when the test scenario was generated in the test scenario step table 115, to the "use case scenario No." field in the record concerned of the test scenario table 116.

The test scenario generation support device 100 sets the value in the "test scenario No." field, listed at the time when the test scenario was generated in the test scenario step table 115, to the "test scenario No." field in the record of the test scenario table 116. The test scenario generation support device 100 sets "−" to the "test classification" field in the record concerned of the test scenario table 116, and likewise sets "−" to the "similar test scenario No." field.

The test scenario generation support device 100 identifies the screen object from the use case scenario as described above, and subsequently sets the respective screen objects corresponding to the predetermined screen data corresponding to the use case scenario to generate the screen mock-up (s102).

The test scenario generation support device 100 in this case sets the respective screen objects (which are held in advance in the storage device 101 as predetermined object data corresponding to the object No.) which have a common "screen No." in the screen object data table 113 to predetermined screen format data held in the storage device 101 in advance, and thereby generates the screen mock-up.

Here, the test scenario generation support device 100 combines pieces of information (respective values of the noun, the verb, the dative object, the accusative object and the like) on the use case step concerned in the use case scenario description table 110, generates a text of the use case scenario describing the use case step and arranges it immediately below the individual screen object. In this way, it is possible to support the screen input performed by the user. For the selective screen object such as the radio button, the test scenario generation support device 100 analyzes the created test scenario to display the number of times each option has been selected. Thus, omissions and biases of the selection are prevented.

Figure 13:
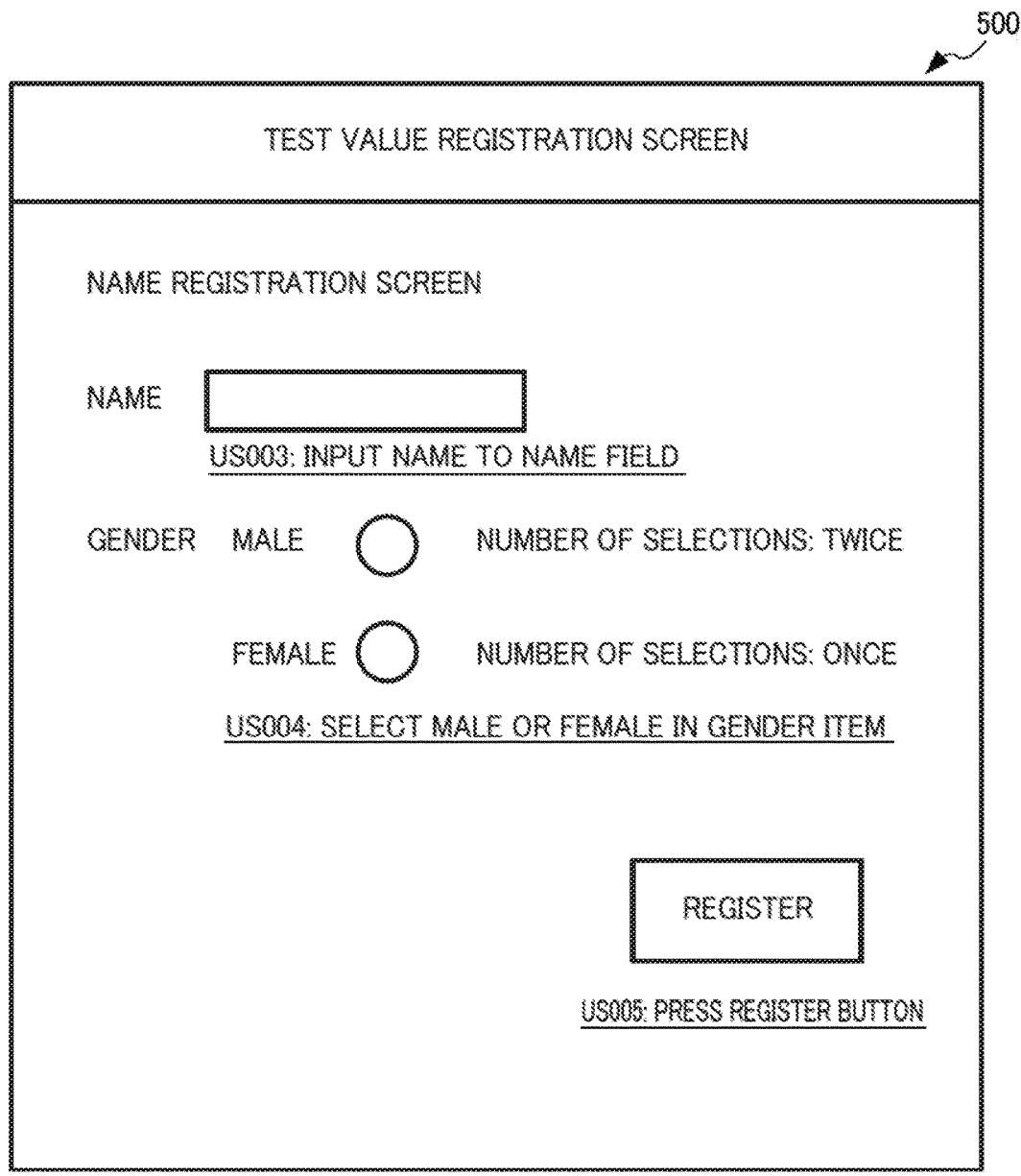
FIG. 13 is a diagram showing a first screen example of one embodiment of the present invention.
Figure 14:
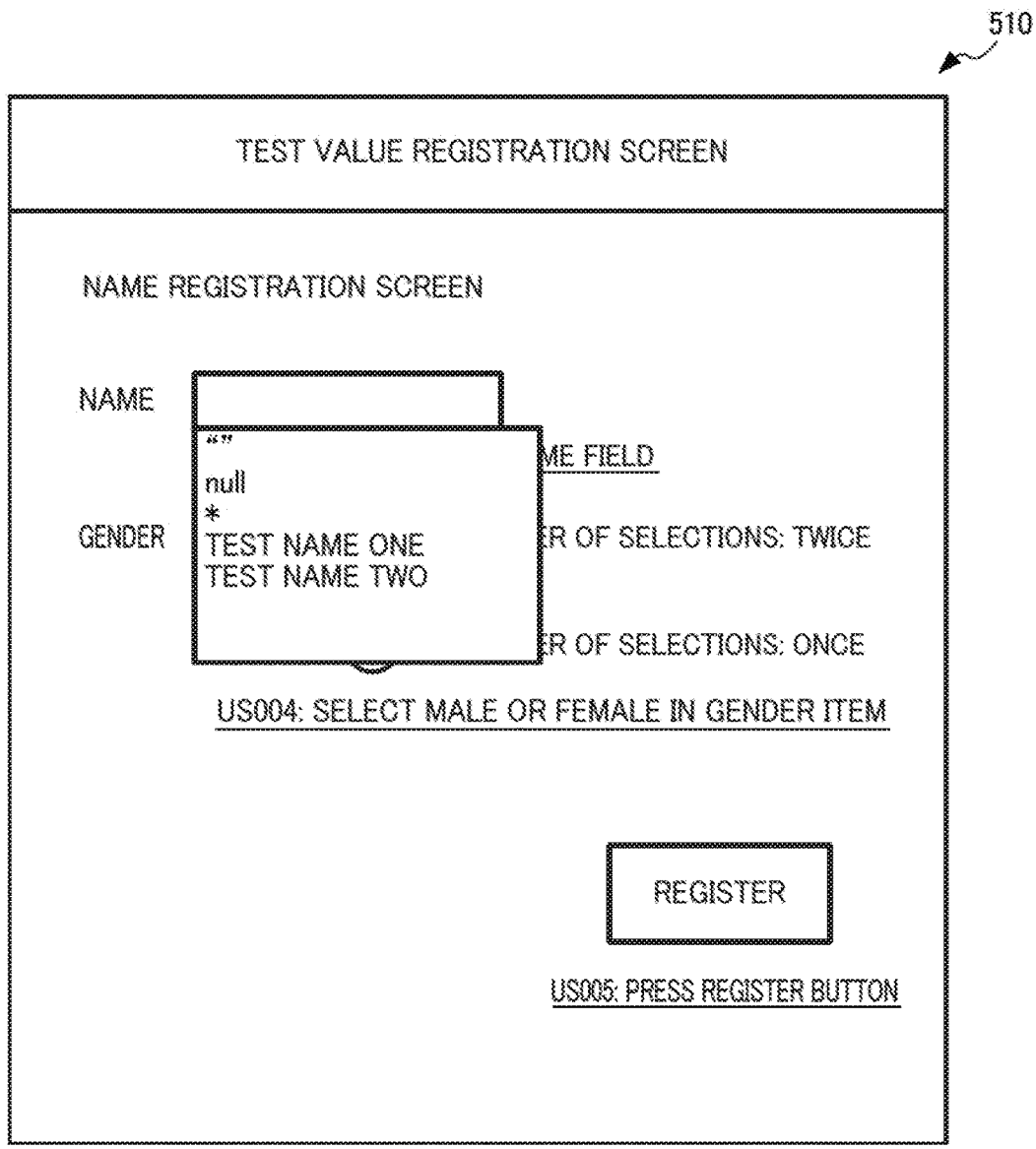
FIG. 14 is a diagram showing a second screen example of one embodiment of the present invention.
Figure 15:
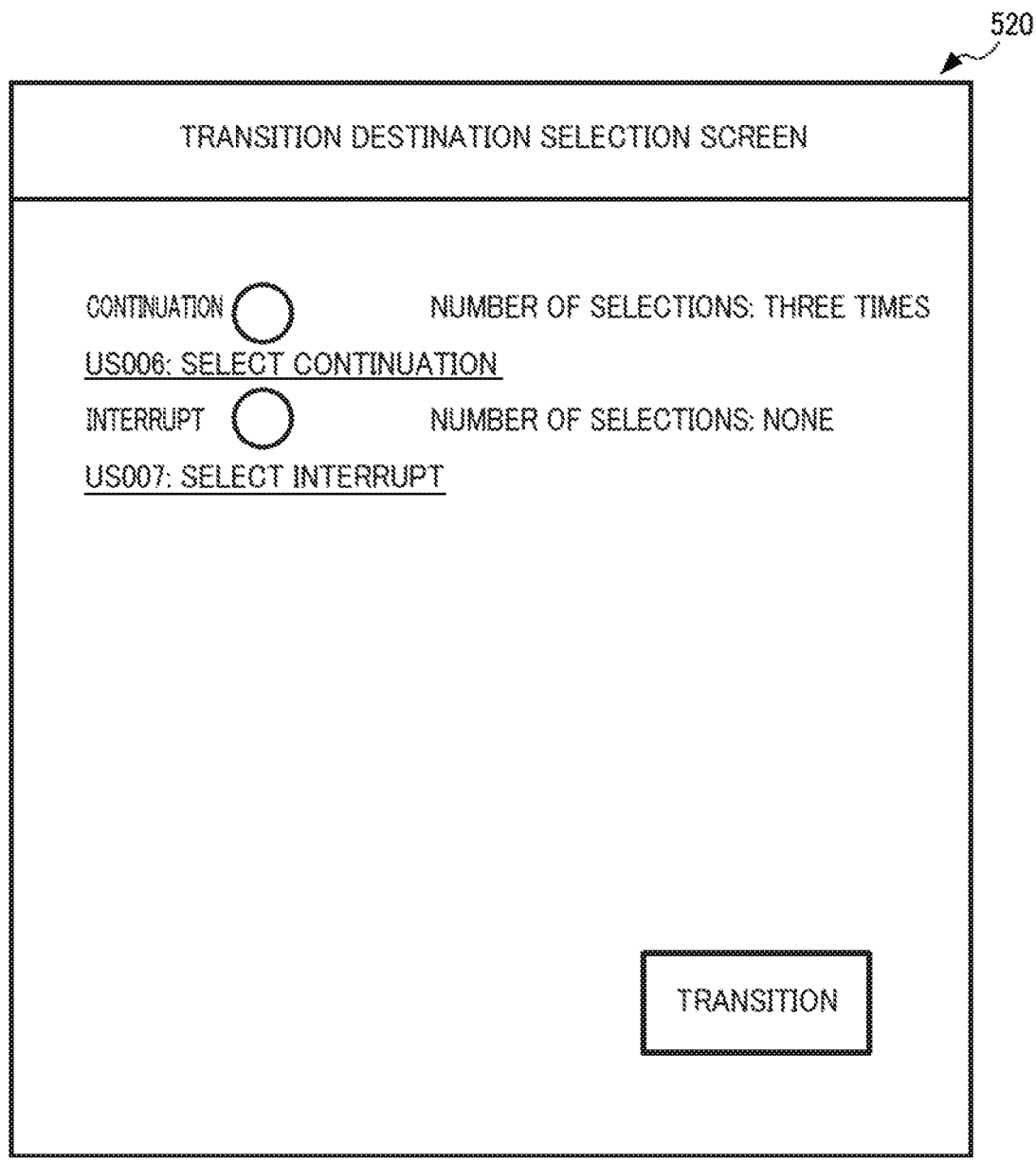
FIG. 15 is a diagram showing a third screen example of one embodiment of the present invention.
Figure 16:
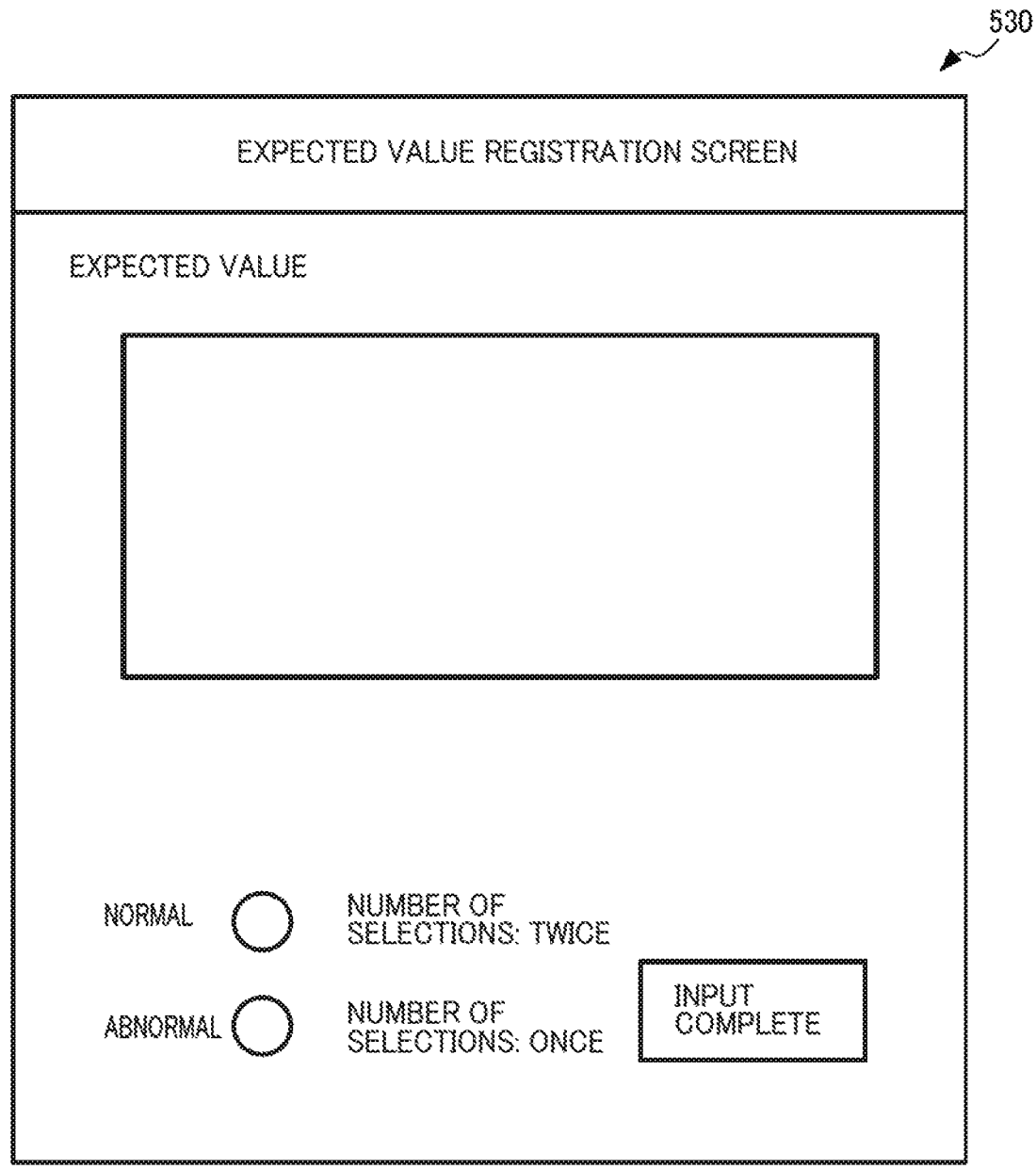
FIG. 16 is a diagram showing a fourth screen example of one embodiment of the present invention.

When the screen object data table 113 described above and the like are included, as the screen mock-up generated by the test scenario generation support device 100, a test value registration screen 500 in FIG. 13, a test value registration screen (when name field history is displayed) 510 in FIG. 14, a transition destination selection screen 520 in FIG. 15, an expected value registration screen 530 in FIG. 16 and the like can be assumed.

When the screen object to be displayed corresponds to a "text field" (which is defined in the object attribute table 111), in the test value registration screen (when name field history is displayed) 510 shown in FIG. 14, a value which has been input (obtained such as by analyzing the created test scenario) is displayed in the screen object concerned.

With this configuration, the user may easily avoid duplicated inputs and omissions of an input.

The transition destination selection screen 520 shown in FIG. 15 is formed by arranging a screen object, such as the "continuation/interruption radio button", which branches the processing. The expected value registration screen 530 shown in FIG. 16 is a screen which is created based on a screen object, such as the "normal/abnormal radio button", in which the expected value of the test scenario is input.

Here, the following description will return to the description of the flow in FIG. 5. The test scenario generation support device 100 outputs the screen mock-up generated as described above to the display device 106, and obtains the value of a user operation for each screen object (s103). The test scenario generation support device 100 holds the value obtained here in the memory 103 as the value in the "condition value" field in the test scenario step table (use case base) 117.

Although the test scenario generation support device 100 generates the test scenario step table (use case base) 117 shown in FIG. 11 under the same policy as the test scenario step table (test pattern base) 115, they differ in that unlike what is described above, the attribute value is not obtained from the test pattern table 114 so as to be set to the "condition value" field, but the input value used by the user to operate with the screen mock-up is set. Otherwise, the configuration of the test scenario step table (use case base) 117 is the same as that of the test scenario step table (test pattern base) 115. The acquisition of the value through the screen mock-up as described above and the processing for generating the record in the test scenario step table (use case base) 117 are repeatedly performed a necessary number of times (for example: number of screen mock-ups).

The test scenario generation support device 100 which receives this generates the test scenario table (use case base) illustrated in FIG. 12, with the test scenario step table (use case base) 117 generated based on the value from the screen mock-up (s104).

In this case, each time the test scenario generation support device 100 receives an input from the screen mock-up described above to generate the test scenario, sets the record in the test scenario table (use case base) 118.

Here, the test scenario generation support device 100 sets, to the "use case scenario No." field, the value of the "use case No." when the record is generated in the test scenario step table 117. The test scenario generation support device 100 also sets, to the "test scenario No." field, the value of the "test scenario No.", that is, "UTS"+3-digit serial numbers ("001"~), at the time when the record was generated in the test scenario step table (use case base) 117.

When the value input to the "normal/abnormal radio button" in the screen object data table 113 is "normal", the test scenario generation support device 100 sets "normal system" to the "test category" field whereas when the value is "abnormal", the test scenario generation support device 100 sets "abnormal system" to the "test category" field.

In generating the record, that is, the test scenario in the test scenario step table (use case base) 117, when the test scenarios already generated in the test scenario step table (test pattern base) 115 and the test scenario step table (use case base) 117 are compared with each other, and for example, a test scenario which satisfies the condition of the similar test scenario set for each user is present, with regard to the test scenario input later in a chronological order, the test scenario generation support device 100 sets, to the "similar test scenario No." field, the "test scenario No." of the previous test scenario in a chronological order.

For example, a case is assumed where as the condition of the similar test scenario, the user makes such a setting that "all values input to the name field are double-byte characters and all the other inputs are equal". Here, the test scenario generation support device 100 compares "UTS001" and "UTS002" in the test scenario of the test scenario step table (use case base) 117, and all the test scenario step Nos. thereof other than "USS01" are equal. With regard to "USS01" which is different, "UTS001" is "test name one", "UTS002" is "test name two" and they are both double-byte characters.

Hence, the test scenario generation support device 100 determines that the condition of the similar test scenario set by the user is satisfied to determine that "UTS001" and "UTS002" are the similar test scenarios. In this case, the test scenario generation support device 100 sets "UTS001" to the "similar test scenario No." field of "UTS002" input later in a chronological order.

Finally, the test scenario generation support device 100, for example, merges the test scenario step table (test pattern base) 115 (FIG. 9) obtained as described above and the test scenario step table (use case base) 117 (FIG. 10), and thereby finally generates the test scenario to be registered in FIG. 17 for output to the display device 106 (s105). In a test scenario 540 in the present embodiment, as illustrated in FIG. 17, for each test scenario step, the screen object and variations in the condition value thereof are associated with the respective values indicating presence/absence thereof in each test scenario (in the example of the figure, "O" indicates presence), normal/abnormal classification and similar scenario.

Although the best mode and the like for practicing the present invention are specifically described above, the present invention is not limited to such, and various modifications are possible without departing from the gist thereof.

According to the present embodiment described above, it becomes possible to support an efficient generation of a test scenario without excess or lack thereof.

According to the description of the present specification, at least the followings are clarified. Specifically, in the test scenario generation support device according to the present embodiment, the computation device may set the identified screen object to predetermined screen data corresponding to the use case scenario to generate a screen mock-up, output the screen mock-up to a predetermined display device, acquire, from an input device, content input by a user to the screen object, use the input content as a test pattern with regard to each screen object, generate an additional test scenario based on the test pattern and merge the generated additional test scenario and the test scenario to generate a merged test scenario.

In this way, the test scenario is automatically generated from an operation by the user on the screen mock-up, and thus it is possible to reduce the necessary number of steps for creating the test scenario. The merging described above may be performed between the test scenarios, and thus the omission of the test scenario is effectively prevented, with the result that it is possible to perform further efficient generation of a test scenario without excess or lack thereof.

In the test scenario generation support device according to the present embodiment, the computation device may identify, in generating the test scenario, test scenarios similar to each other in the created test scenarios based on the predetermined algorithm, and further execute processing for outputting information on the similar test scenarios to the display device.

In this way, similar test scenarios in the created test scenarios are detected, and thus it is possible to effectively prevent the duplication of test scenarios. Hence, it is possible to further efficiently generate a test scenario without excess or lack thereof.

In the test scenario generation support method according to the present embodiment, the information processing device may set the identified screen object to predetermined screen data corresponding to the use case scenario to generate a screen mock-up, output the screen mock-up to a predetermined display device, acquire, from an input device, content input by a user to the screen object, use the input content as a test pattern with regard to the individual screen object, generate an additional test scenario based on the test pattern and merge the generated additional test scenario concerned and the test scenario to generate a merged test scenario.

In the test scenario generation support method according to the present embodiment, the information processing device may identify, in generating the test scenario, test scenarios similar to each other with the created test scenario based on the predetermined algorithm, and further execute processing for outputting information on the similar test scenarios to the display device.

What is claimed is:

1. A test scenario generation support device comprising:
   a storage device configured to hold use case scenarios relating to an application of a test target; and
   a computation device includes a processor configured to identify from the use case scenarios a vocabulary relating to a screen display using a predetermined rule, to identify a screen object corresponding to the identified vocabulary for each of the use case scenarios using a predetermined algorithm, and to generate a test scenario based on a test pattern defined in advance for each screen object, wherein
   the computation device sets the identified screen object to predetermined screen data corresponding to the use case scenario to generate a screen mock-up and outputs the screen mock-up to a predetermined display device, acquires, from an input device, a content input to the screen object by a user and uses the input content as a test pattern on each screen object, generates an additional test scenario based on the test pattern, and merges the generated additional test scenario and the test scenario to generate a merged test scenario.

2. The test scenario generation support device according to claim 1, wherein the computation device identifies, in generating the test scenario, test scenarios similar to each other in created test scenarios based on a predetermined algorithm, and further executes processing for outputting information on the similar test scenarios to a display device.

3. A test scenario generation support method comprising:
   holding, by a storage device included in an information processing device, use case scenarios on an application of a test target,
   identifying, by the information processing device, from the use case scenarios a vocabulary relating to a screen display using a predetermined rule;
   identifying, by the information processing, a screen object corresponding to the identified vocabulary for each of the use case scenarios using a predetermined algorithm; and
   generating, by the information processing, a test scenario based on a test pattern defined in advance for each screen object, wherein
   the information processing device sets the identified screen object to predetermined screen data corresponding to the use case scenario to generate a screen mock-up and outputs the screen mock-up to a predetermined display device, acquires, from an input device, a content input to the screen object by a user and uses the input content as a test pattern on each screen object, generates an additional test scenario based on the test pattern, and merges the generated additional test scenario and the test scenario to generate a merged test scenario.

4. The test scenario generation support method according to claim 3, wherein the information processing device identifies, in generating the test scenario, test scenarios similar to each other in created test 5 scenarios based on a predetermined algorithm, and further executes processing for outputting information on the similar test scenarios to a display device.

* * * * *